N. D. CHARD.
LATHE.
APPLICATION FILED MAR. 14, 1910.

999,629.

Patented Aug. 1, 1911.

2 SHEETS—SHEET 1.

Witnesses
Olive B. Kaiser

Inventor
Nicholas D. Chard
By   Wood & Wood
Attorneys

N. D. CHARD.
LATHE.
APPLICATION FILED MAR. 14, 1910.
999,629.
Patented Aug. 1, 1911.
2 SHEETS—SHEET 2.
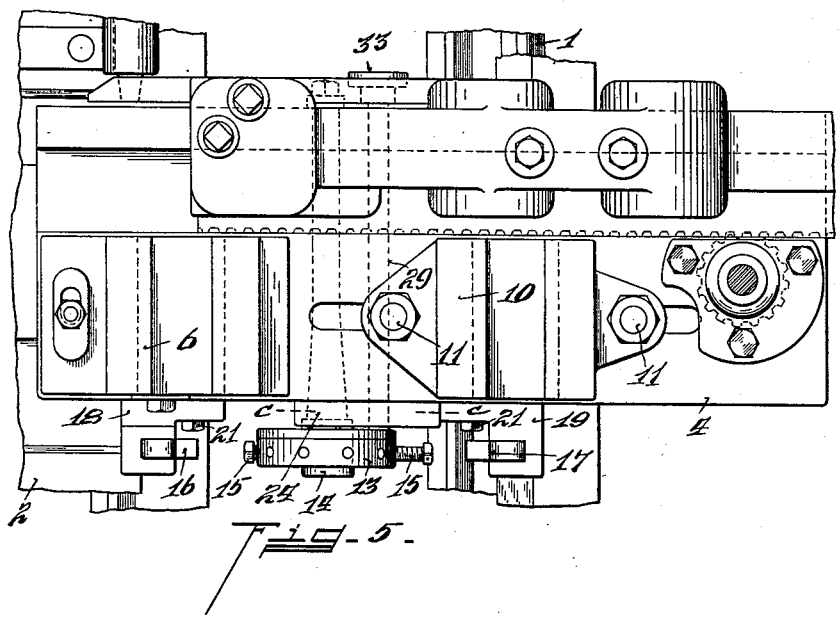
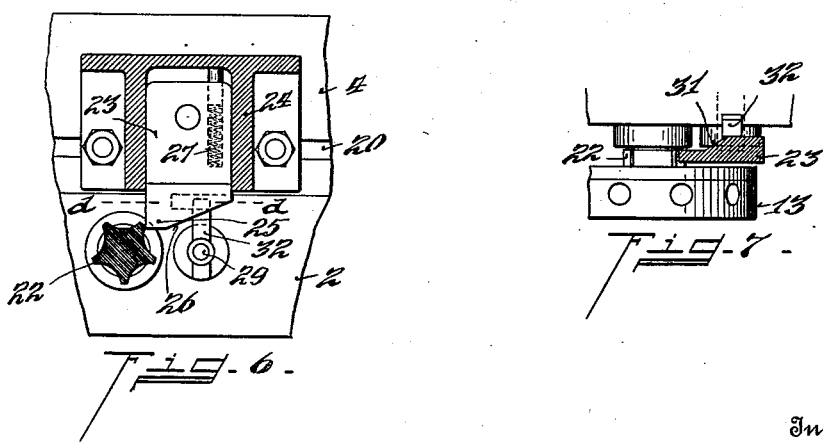
Witnesses
Oliver B. Kaiser
Inventor
Nicholas D. Chard
By Wood & Wood
Attorneys

UNITED STATES PATENT OFFICE.

NICHOLAS D. CHARD, OF CINCINNATI, OHIO, ASSIGNOR TO THE LODGE & SHIPLEY MACHINE TOOL COMPANY, OF CINCINNATI, OHIO, A CORPORATION OF OHIO.

LATHE.

999,629.  Specification of Letters Patent.  Patented Aug. 1, 1911.

Original application filed September 22, 1909, Serial No. 519,025. Divided and this application filed March 14, 1910. Serial No. 549,263.

*To all whom it may concern:*

Be it known that I, NICHOLAS D. CHARD, a citizen of the United States, residing at Cincinnati, in the county of Hamilton and State of Ohio, have invented certain new and useful Improvements in Lathes, of which the following is a specification.

My invention relates to an improvement in lathes.

One of the objects of my invention is to provide a lathe carriage, with means for controlling the hand feed of the tool slide to automatically gage various diameters of cuts.

Another object of my invention is to provide a carriage of a machine tool with a series of adjustable rotating stops, adapted to be automatically actuated to bring one of the series of stops into position upon the feed of the tool slide in one direction, locking the same after it has been set, and in providing the slide with stops to engage said carriage stops to limit the feed of the tool slide, for accurately turning a piece of work with steps of different diameter and the accurate duplication thereof in turning out a number of pieces.

The various features of my invention are more fully set forth in the description of the accompanying drawings, forming a part of this specification, in which—

Figure 1:
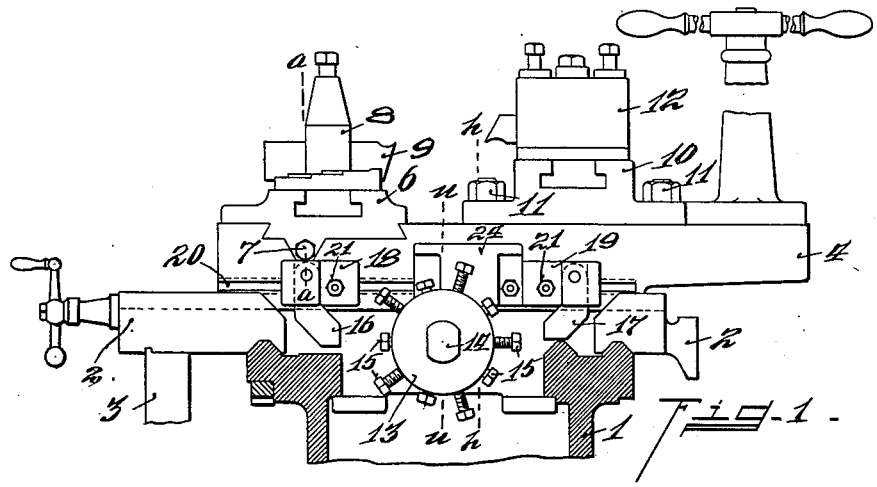
Figures 2, 3:
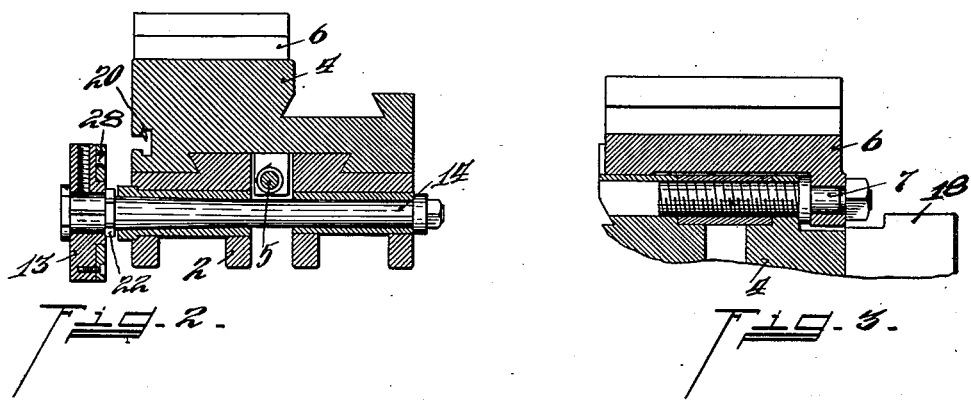
Figure 4:
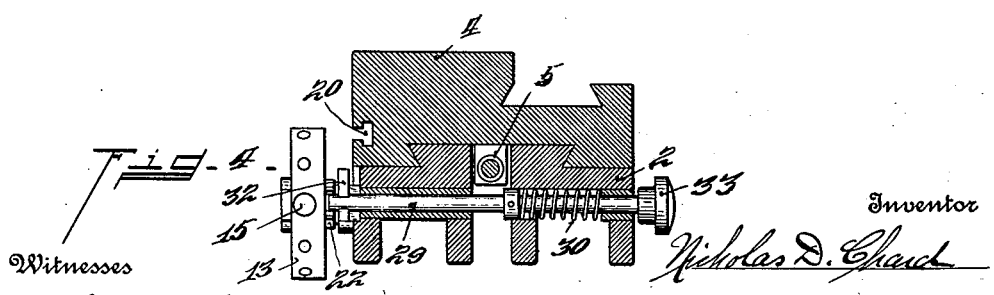

Figure 1 is a side elevation of a lathe carriage with my improvement applied. Fig. 2 is a section on line $u, u$, Fig. 1. Fig. 3 is a section on line $a, a,$ Fig. 1. Fig. 4 is a section on line $h, h,$ Fig. 1. Fig. 5 is a top plan view of the same. Fig. 6 is an enlarged section on line $c, c,$ Fig. 5. Fig. 7 is a section on line $d, d,$ Fig. 6.

With my improved lathe carriage it is possible to turn out duplicate pieces of work with various diameters and predetermined widths to each diameter, without stopping the machine to gage the work, the same being taken care of by the means for stopping the feed of the carriage when the same has traveled a predetermined length for a desired width or cut, and second, limiting the movement of the slide-plate carrying the tools for cutting a predetermined diameter by movement of the slide in one direction, with a reverse movement bringing a second stop in position for turning a second diameter. The feature for automatically stopping the carriage after a predetermined feed is not shown or described herein, as the same is made the subject-matter of a separate application, filed September 22, 1909, Serial No. 519,025, of which this is a division. Such automatic stopping of the lathe carriage enables the turning of duplicate pieces of work to accurate precision, without manually gaging, saving time and rendering the machine capable of being operated by an unskilled mechanic.

1 represents the bed of a lathe.

2 represents a lathe carriage, and 3 the apron therefor, provided with the usual gearing and appliance for feeding the carriage longitudinally upon the bed or base 1. The feeding mechanism being of well known construction, is therefore not illustrated herein.

4 represents a tool-holding slide, having a gibbed connection with the carriage 2, and operated by the cross-feed screw 5, in the usual manner well known in lathe construction. This slide is provided with a plurality of tool-holders for turning work upon each side of the center.

6 represents a tool-rest transversely gibbed upon the slide 4, and adjusted thereon by means of the adjusting screw 7, see Fig. 3.

8 represents a tool-post mounted within a T-slot in the tool-rest 6, and 9 represents the cutting tool.

10 represents a tool-rest adjustable on the slide 4, parallel therewith, and held in position by means of the bolts 11.

12 represents a tool-holder mounted upon the rest 10.

13 represents a stop-disk fixed to an axle 14, journaled within the carriage 3. Said disk upon its periphery is provided with a series of adjusting screws 15, adjustable radially thereon, for limiting the movement of the carriage in either direction of cross-feed.

16, 17, represent stops pivotally connected to the supporting plates 18, 19, respectively, said supporting plates being adjustably mounted upon one side of the slide 4, in the T-slot 20, and each held in position by a nut 21. The stops 16, 17, are placed upon each side of the stop-disk 13, each adapted to engage one of the adjusting screws 15, occupying a horizontal position upon the stop disk alternately in the forward and rearward movement of the slide 4. Thus, the feed of the tool-slide 4, is controlled in either direction of its travel to present the tool to the work within a fixed cutting diameter, assuring the work to be turned accurately without calipering.

In work where different diameters are desired to be cut on a single piece, I have provided means for automatically setting the stop-disk, to present different stops to operative position to be engaged by either one of the stops 16, 17, whereby various diameters can be accurately cut without stopping the machine to gage the work for any one of the different diameters. This is accomplished by rotating the stop-disk partially by the movement of the slide in one direction, with means for locking the disk in such set position during the reverse feed of the tool-slide 4. This is preferably accomplished as follows, see Figs. 2, 5, 6 and 7. 22 represents a star-wheel or flange fixed or formed upon the axle 14, carrying the stop-disk 13, adapted to be engaged in one direction of movement by the dog 23, slidably mounted in the frame 24, said frame being adjustably secured in the T-slot 20, of the slide 4. The point 25 of the dog engaging one tooth of the star-wheel in one direction of movement, see Fig. 6, causing the axle 14 to rotate until the engagement between the nose of the dog 23 and the tooth of the star-wheel is released by the dog moving beyond the star-wheel. The reverse movement of the slide will cause engagement of the inclined surface 26, of the dog 23, upon the star-wheel, raising the dog within its housing or frame 24, to permit the same to pass over the star-wheel without actuating the same, returning to normal position by means of the tension of the spring 27, after the dog has passed over the star-wheel. To prevent the disk with its stop-screws moving farther than one of its steps, the same is locked in position and only released during the shifting movement caused by the dog 23. The stop-disk 13, upon its inner face, is provided with a series of notches 28, suitably spaced and corresponding in number to the number of stop-screws projected from the periphery of the stop-disk. 29 represents a lock-pin slidably mounted in the carriage 2, and under outward moving tension caused by the spring 30, one end of said stop-pin being adapted to engage into the lock-notches 28, upon the disk, for locking the same against rotation. The lock engagement is automatically released by the dog 23, in advance of its engagement with the star-wheel 22 to release the stop-disk. The dog 23 is provided with a cam 31, adapted to engage a pin 32, fixed to the lock-pin 29, throwing the same rearward and disengaging the same from one of the notches, caused by the pin traveling upon the cam during one movement of the dog, the stop-pin remaining in such released position until the movement or travel of the dog has been sufficient to bring a second set of stop-screws into operative position, which movement permits the pin 32, to become disengaged from the cam 31 of the dog 23, which action permits the lock-pin 29 to be thrown into engagement by the release of the tension of the spring 30 into a relatively alined notch of the stop-disk 13, see Figs. 4, 6 and 7.

33 represents a knurl for actuating the lock-pin by hand.

Having described my invention, I claim:—

1. In a machine of the class described, a traveling carriage, a tool-holding slide mounted thereon, a rotatable stop-disk carried by said carriage, a series of adjustable stops projected from the periphery of the stop-disk, stops adjustably mounted upon the slide, each adapted to engage one of the disk stops in either direction of slide movement, means for locking said stop-disk, and means for disengaging said locking means and rotating said stop-disk in one direction of slide movement.

2. In a machine of the class described, a carriage, a tool-holding slide mounted thereon, a rotatable stop-disk journaled in said carriage, a series of stops radially extended therefrom, a stop adjustably mounted upon the slide in alinement with one of the radially projecting stops of the series, means for locking said disk against rotation, and means carried by the slide for releasing said lock and rotating the disk to present a second stop relatively in alinement with the slide stop in one direction of slide movement.

3. In a machine of the class described, a carriage, a tool holding slide thereon, a disk rotatably journaled on the carriage, a series of stops radiating therefrom, a pair of stops adjustably mounted on the slide in the path of the stops on said disk, means for locking said disk in its adjusted position, and means carried by the slide adapted to release said locking means and rotate the disk in one movement of the carriage slide.

4. In a machine of the class described, a traveling carriage, a tool holding slide mounted thereon, stop members adjustably mounted on one side of said slide, rotatable means on said carriage intermediate of said slide stop members, and in their path of travel, presenting differential limits of stop engagement, means on the carriage adapted to engage and lock said carriage stop means, and means movable with the slide adapted to release and rotate said carriage stop.

5. In a machine of the class described, a traveling carriage, a tool holding slide mounted thereon, stop members adjustably mounted on one side of said slide, a stationary stop member mounted on the carriage, provided with independent adjustable stop engaging elements, a trip member mounted on the slide to shift said stop engaging elements, and means under the control of said trip member to clamp said stop elements and release the same prior to shifting.

In testimony whereof, I have hereunto set my hand.

NICHOLAS D. CHARD.

Witnesses:
 OLIVER B. KAISER,
 LUISE BECK.